US012595113B2

(12) United States Patent
Kuga

(10) Patent No.: US 12,595,113 B2
(45) Date of Patent: Apr. 7, 2026

(54) APPLICATION CONTAINER

(71) Applicant: TOKIWA CORPORATION, Gifu (JP)

(72) Inventor: Wataru Kuga, Saitama (JP)

(73) Assignee: TOKIWA CORPORATION, Gifu (JP)

( * ) Notice: Subject to any disclaimer, the term of this patent is extended or adjusted under 35 U.S.C. 154(b) by 164 days.

(21) Appl. No.: 18/754,714

(22) Filed: Jun. 26, 2024

(65) Prior Publication Data

US 2025/0011070 A1 Jan. 9, 2025

(30) Foreign Application Priority Data

Jul. 6, 2023 (JP) ................................ 2023-111263

(51) Int. Cl.

*B65D 83/00* (2006.01)
*A45D 40/04* (2006.01)
*A45D 40/20* (2006.01)
*B41J 2/175* (2006.01)
*B65D 83/16* (2006.01)
*B65D 83/761* (2025.01)

(52) U.S. Cl.

CPC ........... *B65D 83/761* (2025.01); *A45D 40/20* (2013.01); *B41J 2/17503* (2013.01); *B41J 2/17513* (2013.01); *B65D 83/16* (2013.01); *A45D 2040/208* (2013.01); *A45D 2200/1072* (2013.01); *B65D 2583/00* (2013.01)

(58) Field of Classification Search

CPC .. B65D 83/761; B65D 83/16; B65D 2583/00; A45D 40/20; A45D 2040/208; A45D 2200/1072; B41J 2/17503; B41J 2/17513

See application file for complete search history.

(56) References Cited

U.S. PATENT DOCUMENTS

| | | | | | |
|---|---|---|---|---|---|
| 4,544,083 | A * | 10/1985 | Schroeder | A47J 9/00 | 401/175 |
| 4,793,521 | A * | 12/1988 | Steiner | A47K 5/1211 | 222/327 |
| 5,538,161 | A * | 7/1996 | Koehler | A45D 40/04 | 116/200 |
| 6,056,470 | A * | 5/2000 | Nehashi | A45D 34/042 | 401/176 |
| 6,439,274 | B1 * | 8/2002 | DeBoisblanc | F25B 45/00 | 141/94 |

(Continued)

FOREIGN PATENT DOCUMENTS

JP 2022-27171 A 2/2022

*Primary Examiner* — Frederick C Nicolas
(74) *Attorney, Agent, or Firm* — GREENBLUM & BERNSTEIN, P.L.C.

(57) ABSTRACT

An application container includes a leading tube, an outer tubular member, an inner tubular member fixed to the outer tubular member, and a push rod that advances within the inner tubular member and pushes the drawing material, so that a drawing material comes out from an opening of the leading tube. The outer tubular member has a through hole formed in a side surface of the outer tubular member. At least a part of the inner tubular member that is exposed from the through hole is a transparent portion through which the inside of the inner tubular member is visible. The push rod includes a visible portion that is visible from the outside of the inner tubular member through the transparent portion.

5 Claims, 10 Drawing Sheets

(56) References Cited

U.S. PATENT DOCUMENTS

| | | | | | |
|---|---|---|---|---|---|
| 8,540,124 | B2 * | 9/2013 | Francavilla | B65D 83/761 222/391 | |
| 8,827,115 | B1 * | 9/2014 | Katz | G01F 11/44 222/158 | |
| 10,299,564 | B2 * | 5/2019 | Ishida | A45D 40/12 | |
| 10,967,667 | B2 * | 4/2021 | Tani | A45D 40/205 | |
| 11,980,276 | B2 * | 5/2024 | Kuga | A45D 40/205 | |
| 12,156,581 | B2 * | 12/2024 | Kuga | A45D 40/06 | |
| 2008/0121658 | A1 * | 5/2008 | Rosner | A21C 15/005 222/158 | |
| 2008/0124165 | A1 * | 5/2008 | Rosner | B65D 35/30 401/175 | |
| 2008/0175649 | A1 * | 7/2008 | Lee | B43K 5/005 401/192 | |
| 2015/0030370 | A1 * | 1/2015 | Tani | A45D 40/12 401/74 | |
| 2015/0030372 | A1 * | 1/2015 | Tani | B43K 24/06 401/75 | |
| 2017/0151826 | A1 * | 6/2017 | Tani | A45D 40/24 | |
| 2017/0332764 | A1 * | 11/2017 | Lee | A45D 40/04 | |
| 2022/0265027 | A1 * | 8/2022 | Sasaki | A45D 40/205 | |
| 2023/0157436 | A1 * | 5/2023 | Kuga | A45D 40/06 401/75 | |

* cited by examiner

APPLICATION CONTAINER

CROSS-REFERENCE TO RELATED APPLICATIONS

This application claims the benefit of priority from Japanese Patent Application No. 2023-111263, filed on Jul. 6, 2023, the entire contents of which are incorporated herein by reference.

BACKGROUND

The present disclosure relates to an application container for applying a drawing material.

Japanese Patent Laid-open No. 2022-027171 describes a feeding container including a case body that feeds a solid content. The case body includes a cylindrical case main body unit extending along an axis and a cylindrical nozzle body fitted to an upper portion of the case main body unit. A lower end of the case main body unit is fitted with a bottom cap body that closes an opening at the lower end of the case main body unit.

A shaft body extending in a straight line along the axis is disposed within the case body. The shaft body includes, at an upper end thereof, a holding portion that holds the solid content. When the shaft body moves upward with respect to the case body, the solid content whose lower end side part is held by the holding portion moves upward together with the shaft body, and is fed outward from a feeding port formed at an upper end of the nozzle body.

The feeding container includes a window portion for checking a remaining amount, the window portion extending in an upward-downward direction in the case main body unit, and a remaining amount display portion that makes the shaft body visible from the outside through the window portion. The window portion is a slit-shaped hole that penetrates the case body from the inside to the outside. A dimension in the upward-downward direction of the window portion corresponds to an upward movable distance of the shaft body within the case body. The remaining amount display portion has a tubular shape that is enlarged in diameter from a lower end of the shaft body and that extends downward from the shaft body. The bottom cap body has a cylindrical inner wall extending upward from the bottom cap body. The inner wall is located on an inner side of the remaining amount display portion.

When the solid content is new and the shaft body is at an initial position as a lower stroke end position, a lower end of the remaining amount display portion is located slightly below a lower end of the window portion, and the whole of the window portion is closed by the remaining amount display portion. A user can confirm that the solid content is new because the whole of the window portion is closed by the remaining amount display portion.

Meanwhile, when the shaft body moves upward relative to the case main body unit as the solid content is fed, the remaining amount display portion relatively moves upward together with the shaft body. The inner wall located on the inner side of the remaining amount display portion thus starts to appear. The user can check a remaining amount of the solid content by visually checking the length of the remaining amount display portion exposed in the window portion and the length of the inner wall exposed in the window portion.

Further, when the shaft body moves to an upper stroke end position and the feedable solid content is exhausted, the lower end of the remaining amount display portion moves to above the window portion, and only the inner wall is exposed in the window portion. At this time, only the inner wall is visible from the window portion. The user can thus confirm that the solid content is exhausted.

SUMMARY

In the feeding container described above, the window portion is a slit-shaped hole that penetrates the case body from the inside to the outside, and the movable remaining amount display portion is disposed on the inner side of the hole. The inner wall is disposed further inward of the movable remaining amount display portion. Hence, because the remaining amount display portion located between the window portion and the inner wall is movable, there is a possibility of foreign matter such as dust entering a space between an edge of the window portion and the remaining amount display portion and a space between the remaining amount display portion and the inner wall as the remaining amount display portion moves. Since the dust or the like may be accumulated on the inner side of the window portion, there is thus room for improvement in terms of hygiene.

In some cases of an application container, a highly volatile drawing material may be used. However, in the case where the remaining amount display portion located on the inner side of the window portion penetrating from the inside to the outside is movable as in the feeding container described above, internal airtightness may not be maintained. Hence, it is desired to ensure airtightness.

It is an object of the present disclosure to provide an application container that makes it possible to recognize the remaining amount of a drawing material, achieve hygiene, and ensure airtightness.

(1) An application container according to the present disclosure includes a leading tube that is configured to house a drawing material and that has an opening at a tip end of the leading tube, the opening allowing the drawing material to come out, an outer tubular member coupled to a side of the leading tube opposite to the opening, an inner tubular member fixed within the outer tubular member to the outer tubular member, and a push rod that is rotatable synchronously with the inner tubular member within the inner tubular member and that is configured to advance with respect to the inner tubular member and push the drawing material, so that the drawing material comes out from the opening. The outer tubular member has a through hole formed in a side surface of the outer tubular member. At least a part of the inner tubular member that is exposed from the through hole is a transparent portion through which an inside of the inner tubular member is visible. The push rod includes a visible portion that is visible from an outside of the inner tubular member through the transparent portion, so that a remaining amount of the drawing material is recognizable when a state of the visible portion that is visible through the transparent portion is visually checked.

According to the application container, it is possible to recognize the remaining amount of the drawing material when the visible portion of the push rod that is visible through the transparent portion is viewed. In this application container, the inner tubular member including the transparent portion is fixed to the outer tubular member, and the inner tubular member does not move with respect to the outer tubular member. Hence, because the inner tubular member, which is located between the through hole of the outer tubular member and the push rod, does not move, a possibility of foreign matter entering the inner side of the through hole can be reduced. A hygienic application container can therefore be provided. Further, because the inner tubular member is fixed on the inner side of the through hole to the outer tubular member, airtightness on the inner side of the through hole can be ensured.

(2) In the foregoing (1), the application container may further include a tubular female screw member that is rotatable synchronously with the leading tube within the leading tube and that internally has a female screw. The push rod may have a male screw configured to screw into the female screw. The outer tubular member may be rotatable relative to the leading tube. In response to a relative rotation of the outer tubular member with respect to the leading tube, a screwing action between the male screw and the female screw functions, so that the push rod may advance with respect to the female screw member. In this case, the push rod advances in response to the relative rotation of the outer tubular member with respect to the leading tube, and allows the drawing material to come out from the opening.

(3) In the foregoing (1) or (2), the inner tubular member may have a printed portion that is located on a side opposite to the through hole as viewed from the transparent portion. The remaining amount of the drawing material is recognizable when the printed portion is visually checked. In this case, a user using the application container can more directly recognize the remaining amount of the drawing material by visually checking the printed portion. Hence, the remaining amount of the drawing material can be more noticeable.

(4) In the foregoing (3), the inner tubular member may have an outer surface facing the outer tubular member and an inner surface facing the push rod. The transparent portion may have a first surface exposed from the through hole and a second surface facing in a direction opposite to the first surface. The second surface may include a protruding surface portion that protrudes inward of the inner tubular member with respect to an imaginary extension surface extending along the inner surface. In this case, because the second surface of the transparent portion protrudes inward, the transparent portion has a lens shape. Hence, the printed portion appears to be enlarged when the printed portion described above is visually checked through the transparent portion. The remaining amount of the drawing material can therefore be displayed in a more noticeable manner.

(5) In the foregoing (2), the application container may further include a ratchet mechanism that allows a relative rotation in one direction of the outer tubular member with respect to the leading tube and that restricts a relative rotation in a direction opposite to the one direction of the outer tubular member with respect to the leading tube. The push rod that is capable of only advancing in response to the relative rotation in the one direction of the outer tubular member with respect to the leading tube is visible through the transparent portion. In this case, since the push rod does not retract, the display of the remaining amount of the drawing material using the visible portion of the push rod can be more accurate. Hence, the remaining amount of the drawing material can be recognized more appropriately.

According to the present disclosure, it is possible to recognize the remaining amount of the drawing material, achieve hygiene, and ensure airtightness.

DETAILED DESCRIPTION

Figure 1A:
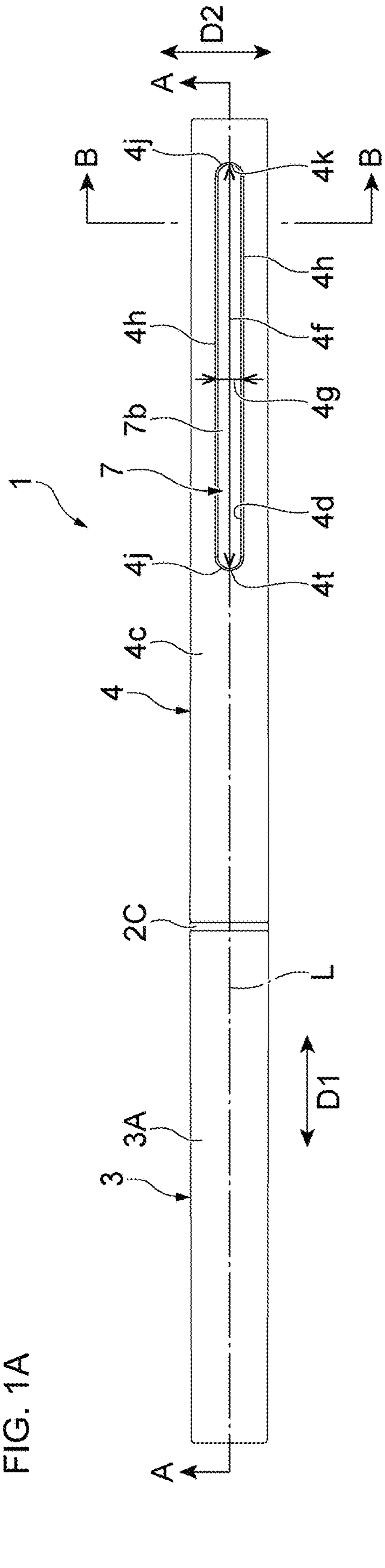
FIG. 1A is a side view illustrating an application container according to an embodiment.

In the following, an application container according to an embodiment of the present disclosure will be described with reference to the drawings. Identical or equivalent elements in the description of the drawings are denoted by the same reference symbols, and repeated description thereof will be omitted as appropriate. The drawings may be partly depicted in a simplified or exaggerated manner in order to facilitate understanding, and dimensional ratios and the like are not limited to those depicted in the drawings.

Figure 1B:
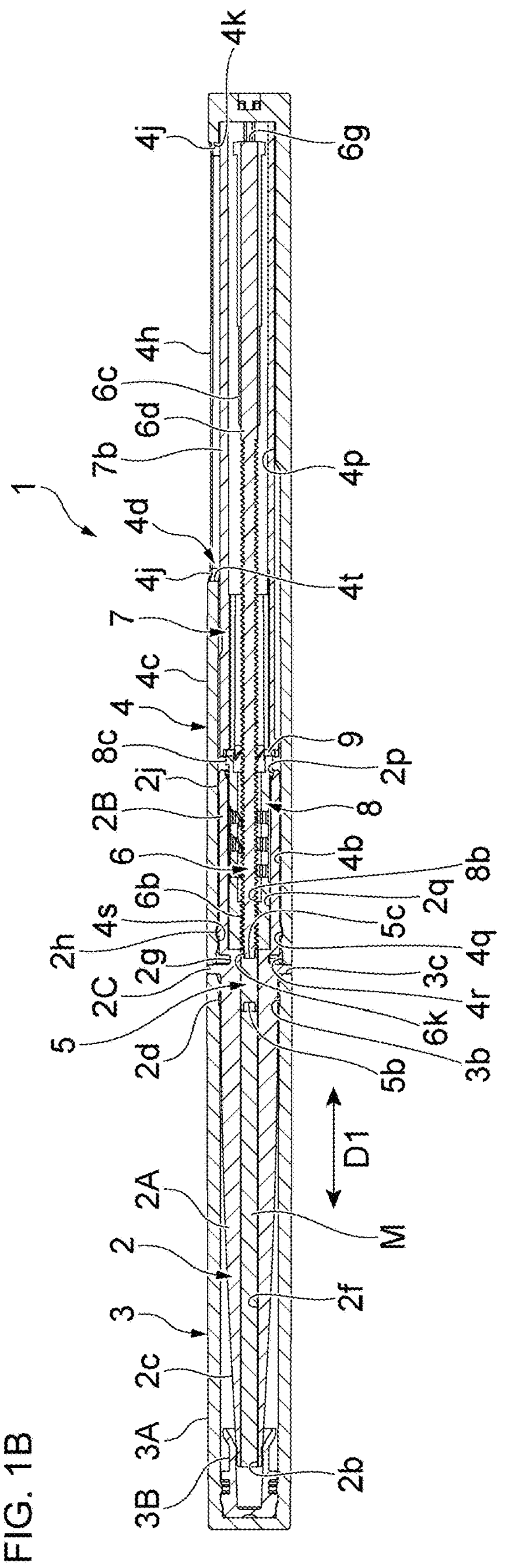
FIG. 1B is a cross-sectional view taken along line A-A of FIG. 1A.

FIG. 1A is a side view illustrating the application container according to the present embodiment. FIG. 1B is a cross-sectional view taken along line A-A of FIG. 1A. As illustrated in FIG. 1A and FIG. 1B, an application container 1 according to the present embodiment is, for example, a pencil that feeds (extrudes) a drawing material M housed within the application container 1 according to an operation of a user.

In the present embodiment, the drawing material M is a cosmetic material. The "cosmetic material" is, for example, a rouge, a lipstick, a lip liner, a lip gloss, an eyeliner, an eyebrow product, an eye shadow, a concealer, or a beauty stick. The "cosmetic material" may be a rod-shaped object including a flexible material (for example, a flexible material in a semisolid state, a soft solid state, a jelly state, or a mousse state, pastes including these, or the like). The drawing material M is volatile, for example. As an example, the drawing material M is a rod-shaped cosmetic material.

The application container 1 includes a leading tube 2 housing the drawing material M, a cap 3 for covering the leading tube 2, and an outer tubular member 4 located on a side of the leading tube 2 opposite to the cap 3. In the application container 1, some components including the leading tube 2, the cap 3, and the outer tubular member 4 are in a tubular shape. In the application container 1, an axis L of each of the components in a tubular shape extends in the same direction in a state in which the components are assembled. In the following, the direction in which the axis L extends will be referred to as an axial direction D1. The axial direction D1, for example, coincides with a longitudinal direction of the application container 1.

A "front," a "front side," and a "forward direction" represent a direction from the outer tubular member 4 to the leading tube 2 in the axial direction D1. A "rear," a "rear side," and a "rearward direction" represent a direction from the leading tube 2 to the outer tubular member 4 in the axial direction D1. A "radial direction" represents a direction orthogonal to the axis L. A "circumferential direction" represents a direction along a ring having the axis L as a center thereof (rotational direction). In the present embodiment, a direction of extruding the drawing material M is the forward direction (advancing direction), and a direction opposite thereto is the rearward direction.

The leading tube 2 has an opening 2*b* at a tip end (front end portion of the leading tube 2). The opening 2*b* allows the drawing material M to come out. The leading tube 2 includes a front side tubular portion 2A exposed when the cap 3 is removed, a rear side tubular portion 2B inserted inside the outer tubular member 4, and a flange portion 2C interposed between the front side tubular portion 2A and the rear side tubular portion 2B. The front side tubular portion 2A has the opening 2*b* located at one end in the axial direction D1 and a tapered surface 2*c* inclined such that the leading tube 2 is enlarged in diameter with increase in distance from the opening 2*b*.

The opening 2*b* is a part from which the drawing material M in the leading tube 2 is exposed. The drawing material M is protruded from the opening 2*b*, and the drawing material M is provided for usage. The tapered surface 2*c* extends, for example, from the opening 2*b* to a position beyond a center in the axial direction D1 of the leading tube 2. The front side tubular portion 2A has a protruding portion 2*d* located rearward of the tapered surface 2*c*. The protruding portion 2*d* engages with a recessed portion 3*b* of the cap 3 to be described later. The cap 3 is fitted to the leading tube 2 in a state in which an end surface 3*c* defining an opening of the cap 3 faces the flange portion 2C along the axial direction D1. The flange portion 2C is exposed in a state in which the cap 3 is fitted to the leading tube 2.

An internal space 2*f* of the leading tube 2 extends rearward from the opening 2*b*. The internal space 2*f* penetrates the leading tube 2 in the axial direction D1. The drawing material M, a piston 5, and a push rod 6 are housed in internal space 2*f*. The piston 5 has, for example, a first recessed portion 5*b* recessed at a front end and a second recessed portion 5*c* recessed at a rear end. The drawing material M, the piston 5, and the push rod 6 are arranged so as to be aligned in this order.

The rear side tubular portion 2B has an annular recessed portion 2*g* located on a rear side of the flange portion 2C, a first annular protruding portion 2*h* located rearward of the annular recessed portion 2*g*, and a second annular protruding portion 2*j* located rearward of the first annular protruding portion 2*h*. The first annular protruding portion 2*h* engages with an inner surface 4*b* of the outer tubular member 4 in the axial direction D1. With this configuration, the leading tube 2 is coupled to the outer tubular member 4 in an axially immovable and relatively rotatable manner.

The cap 3 includes an outer cap 3A in a bottomed cylindrical shape and an inner cap 3B in a stepped cylindrical shape that is held in a bottom portion of the outer cap 3A. The outer cap 3A is made of polypropylene (PP), for example. The inner cap 3B is made of thermoplastic polyester elastomer (TPEE), for example. However, the material of the outer cap 3A and the material of the inner cap 3B are not limited to the above-described examples.

The outer tubular member 4 has, for example, a bottomed tubular shape (bottomed cylindrical shape as an example). The outer tubular member 4 is coupled to a side of the leading tube 2 opposite to the opening 2*b*. The outer tubular member 4 has a side surface 4*c* facing in a direction intersecting the axial direction D1. The outer tubular member 4 has a through hole 4*d* formed in the side surface 4*c*. For example, the through hole 4*d* extends from a center in the axial direction D1 of the outer tubular member 4 to an end portion (rear end portion) in the axial direction D1 of the outer tubular member 4.

The through hole 4*d* makes the inside and outside of the outer tubular member 4 communicate with each other. That is, the through hole 4*d* penetrates the outer tubular member 4 in a radial direction. The through hole 4*d* has, for example, a major axis 4*f* extending along the axial direction D1 and a minor axis 4*g* extending along a circumferential direction D2 of the outer tubular member 4. As an example, the through hole 4*d* is in a rectangular shape with rounded corners.

The through hole 4*d* is, for example, defined by linear portions 4*h* extending along the axial direction D1 and a pair of curved portions 4*j* curved in such a manner that the through hole 4*d* bulges outward at each of both ends of the linear portions 4*h*. In this case, the through hole 4*d* is defined by a pair of the linear portions 4*h* arranged along the circumferential direction D2 and the pair of curved portions 4*j* arranged along the axial direction D1.

The outer tubular member 4 has an opening 4*r* that a part of the leading tube 2 (rear side tubular portion 2B) enters. The outer tubular member 4 has, at the inner surface 4*b* of the outer tubular member 4, an annular recessed portion 4*q* recessed outward in the radial direction of the outer tubular member 4 and an annular protruding portion 4*s* located forward of the annular recessed portion 4*q*. The first annular protruding portion 2*h* of the leading tube 2 engages with the annular recessed portion 4*q* in the axial direction D1.

The application container 1 includes an inner tubular member 7 fixed within the outer tubular member 4 to the outer tubular member 4. The outer tubular member 4 has a protrusion 4*p* on the inner surface 4*b* of the outer tubular member 4. The protrusion 4*p* protrudes inward in the radial direction of the outer tubular member 4. The inner tubular member 7 engages with the protrusion 4*p* in the circumferential direction. With this configuration, the inner tubular member 7 engages with the outer tubular member 4 in a synchronously rotatable manner.

The push rod 6 is rotatable synchronously with the inner tubular member 7 within the inner tubular member 7. The push rod 6 advances with respect to the inner tubular member 7 and pushes the drawing material M, so that the drawing material M comes out from the opening 2*b* of the leading tube 2. The push rod 6 has a male screw 6*b* formed on a periphery of the push rod 6 and an engaging portion 6*c* that engages with the inner tubular member 7 in the circumferential direction D2. The male screw 6*b* and the engaging portion 6*c* are aligned along the axial direction D1. The male screw 6*b* is located forward of the engaging portion 6*c*.

The application container 1 includes a female screw member 8 in a tubular shape. The female screw member 8 is provided within the leading tube 2. More specifically, the female screw member 8 is housed in the rear side tubular portion 2B of the leading tube 2. For example, an end portion 8*c* in the axial direction D1 of the female screw member 8 projects from an opening 2*p* formed at one end in the axial direction D1 of the leading tube 2. The female screw member 8 is rotatable synchronously with the leading tube 2. The female screw member 8 internally has a female screw 8*b*. The male screw 6*b* of the push rod 6 screws into the female screw 8*b*. The push rod 6 and the female screw member 8 will be described later in detail.

Figure 2:
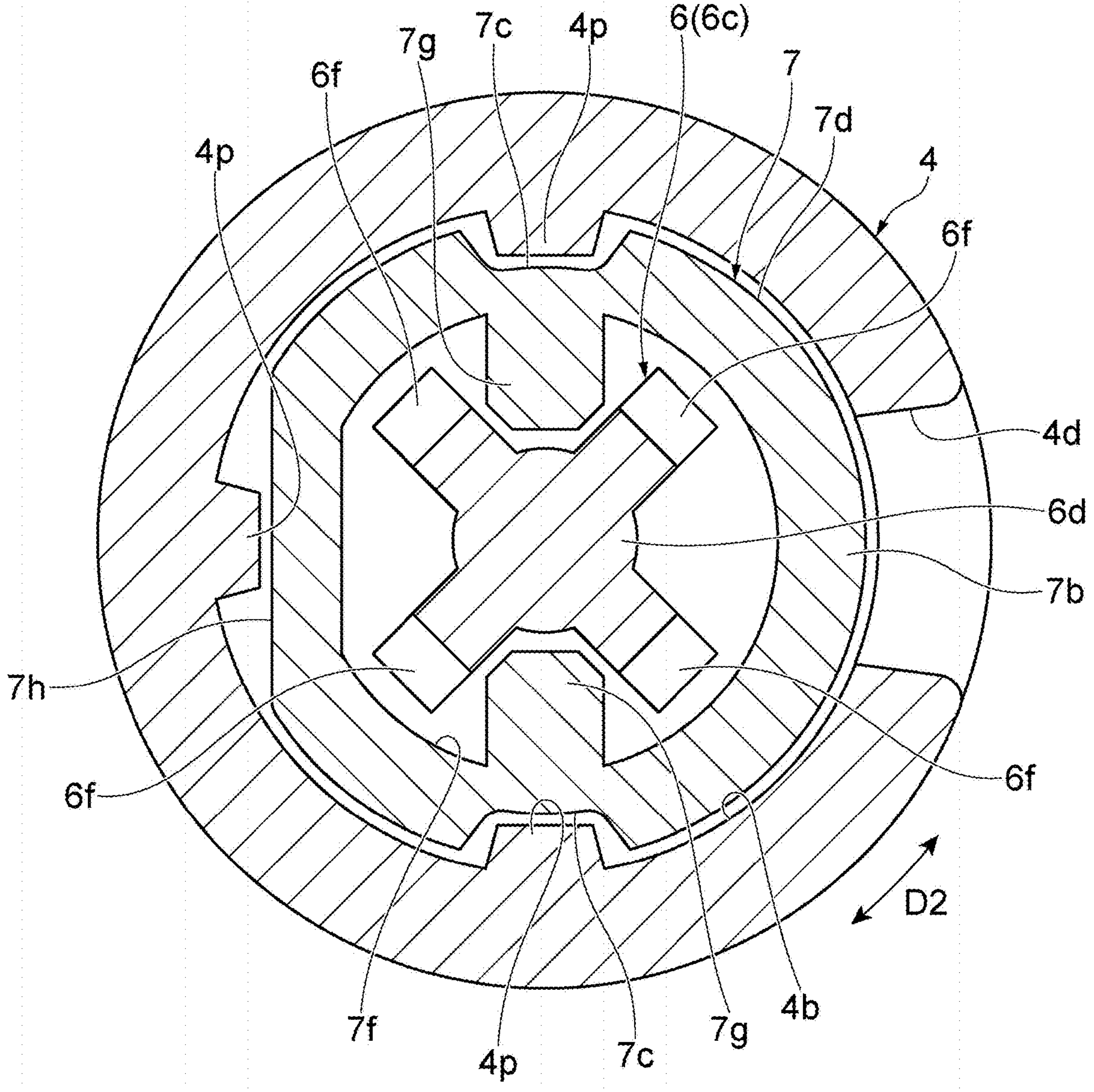
FIG. 2 is a cross-sectional view taken along line B-B of FIG. 1A.

FIG. 2 is a cross-sectional view taken along line B-B of FIG. 1A. As illustrated in FIG. 1A, FIG. 1B, and FIG. 2, the push rod 6 is housed in the inner tubular member 7, and the inner tubular member 7 is housed in the outer tubular member 4. A part of the inner tubular member 7 is exposed from the through hole 4*d* of the outer tubular member 4.

The inner tubular member 7 includes a transparent portion 7*b*. The "transparent portion" is a part or a component that is transparent. "Transparent" means having an average visible light transmittance of a certain value or more. The "certain value" is, for example, 60%, 80%, or 90%. "Transparent" may be colorless and transparent, colored and transparent, or translucent. In the present embodiment, the inside of the inner tubular member 7 is visible through the transparent portion 7*b*.

The inner tubular member 7 is made of polyethylene terephthalate (PET), for example. In the present embodiment, the inner tubular member 7 is made up of one or more transparent components. That is, the inner tubular member 7 is a transparent member. In this case, the transparent portion 7*b* is the whole of the inner tubular member 7. However, the transparent portion 7*b* may be a part of the inner tubular member 7. At least a part of the inner tubular member 7 that is exposed from the through hole 4*d* is the transparent portion 7*b*. Hence, the inside of the inner tubular member 7 is visible through the transparent portion 7*b*.

The outer tubular member 4 has, for example, a plurality of protrusions 4*p*. The inner tubular member 7 has, for example, a recessed portion 7*c* recessed inward in the radial direction of the inner tubular member 7. The plurality of protrusions 4*p* are arranged along the circumferential direction D2. The inner tubular member 7 has a plurality of recessed portions 7*c*. The plurality of recessed portions 7*c* are arranged along the circumferential direction D2. At least one of the plurality of protrusions 4*p* enters a recessed portion 7*c*.

In the example of FIG. 2, two of three protrusions 4*p* enter the recessed portions 7*c*. With this configuration, the outer tubular member 4 is fixed to the inner tubular member 7. Incidentally, in order to ensure airtightness within the application container 1, one of the inner surface 4*b* of the outer tubular member 4 and an outer surface 7*d* of the inner tubular member 7 may be provided with a projection for airtightness.

The push rod 6 includes a visible portion 6*d* that is visible from the outside of the inner tubular member 7 through the transparent portion 7*b*. The visible portion 6*d* is a part of the push rod 6 which part is visible from the outside of the inner tubular member 7 through the transparent portion 7*b*. The visible portion 6*d* includes, for example, a part (rear side portion) of the male screw 6*b* and the engaging portion 6*c* that engages with the inner tubular member 7.

The engaging portion 6*c* has a plurality of projections 6*f* that project outward in the radial direction of the push rod 6. The plurality of projections 6*f* are arranged along the circumferential direction D2. The inner tubular member 7 has a projection 7*g* on an inner surface 7*f* of the inner tubular member 7. The projection 7*g* projecting inward in the radial direction. For example, the inner tubular member 7 has a plurality of projections 7*g* arranged along the circumferential direction D2. The projections 7*g* each enters a space between two projections 6*f* arranged side by side along the circumferential direction D2.

The application container 1 includes a ratchet mechanism 9 located at a front end of the inner tubular member 7 and a rear end of the female screw member 8. The ratchet mechanism 9 allows a relative rotation in one direction of the outer tubular member 4 with respect to the leading tube 2, and restricts a relative rotation in a direction opposite to the one direction of the outer tubular member 4 with respect to the leading tube 2.

When the outer tubular member 4 is relatively rotated in the one direction with respect to the leading tube 2, the inner tubular member 7 and the push rod 6 are relatively rotated together with the outer tubular member 4 with respect to the leading tube 2 and the female screw member 8. The push rod 6 is thus relatively rotated with respect to the female screw member 8 and a screwing action between the male screw 6*b* and the female screw 8*b* functions, so that the push rod 6 advances with respect to the female screw member 8. Meanwhile, the push rod 6 does not retract because the outer tubular member 4 is prevented from being relatively rotated in the opposite direction with respect to the leading tube 2.

As described earlier, the push rod 6 advances with respect to the inner tubular member 7 and pushes the drawing material M. In the present embodiment, the push rod 6 is only allowed to advance with respect to the inner tubular member 7, and does not retract with respect to the inner tubular member 7. In an initial state, that is, when the drawing material M has not been used (when the drawing material M is unused), for example, the position in the axial direction D1 of a rear end 6*g* of the push rod 6 coincides with the position in the axial direction D1 of a rear end 4*k* of the through hole 4*d*.

Hence, in the initial state, the whole of the visible portion 6*d* of the push rod 6 is visible from the through hole 4*d* through the transparent portion 7*b*, and the visible portion 6*d* is visible in the whole in the axial direction D1 of the transparent portion 7*b*. Because the whole of the visible portion 6*d* is seen in the transparent portion 7*b*, the user of the application container 1 can recognize that the push rod 6 has not advanced and therefore the drawing material M has not been used.

When the push rod 6 advances and the drawing material M is used, the visible portion 6*d* advances in the transparent portion 7*b*, and the length in the axial direction D1 of the visible portion 6*d* that is visible decreases. By viewing the state in which the length of the visible portion 6*d* that can be seen through the transparent portion 7*b* is shortened, the user can recognize that the amount of the drawing material M has decreased.

When the drawing material M is further used and is about to be exhausted, the visible portion 6*d* further advances in the transparent portion 7*b*. Then, the position in the axial direction D1 of the rear end 6*g* of the push rod 6 and the position in the axial direction D1 of a front end 4*t* of the through hole 4*d* coincide with each other, and the visible portion 6*d* is no longer visible through the transparent portion 7*b* (see FIG. 8B). Because the visible portion 6*d* is no longer visible through the transparent portion 7*b*, the user can recognize that the drawing material M is about to be exhausted.

As described above, the remaining amount of the drawing material M is recognizable when the state of the visible portion 6*d* that is visible through the transparent portion 7*b* is visually checked. Incidentally, the visible portion 6*d* may be colored in order to make the display of the visible portion 6*d* through the transparent portion 7*b* easy to notice. In this case, with the length of the colored visible portion 6*d* visually checked the remaining amount of the drawing material M can be displayed in an easily noticeable manner.

Figure 3A:
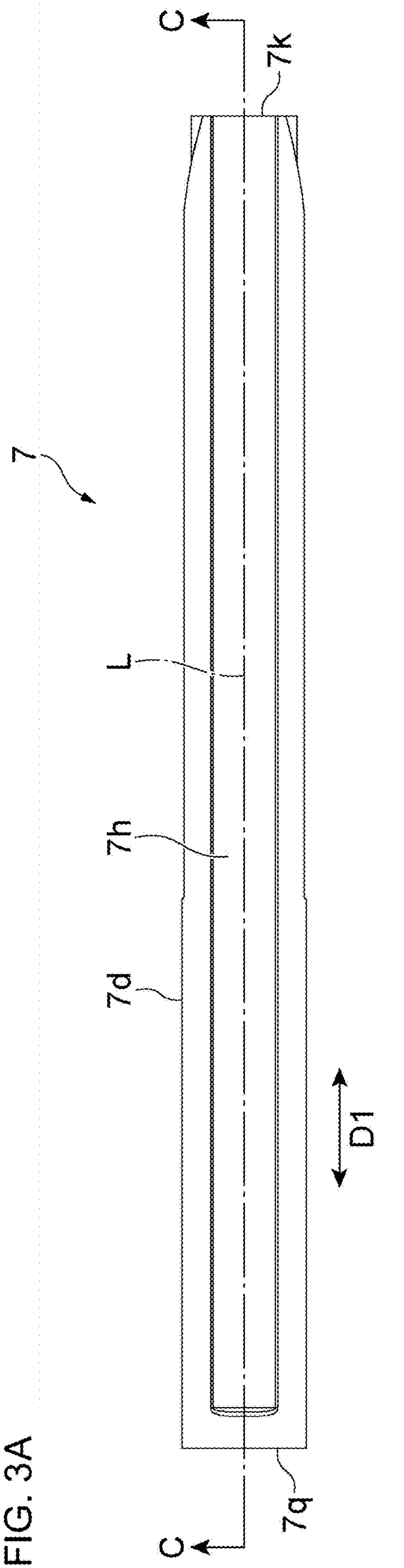
FIG. 3A is a side view illustrating an inner tubular member of the application container according to the embodiment.
Figure 3B:
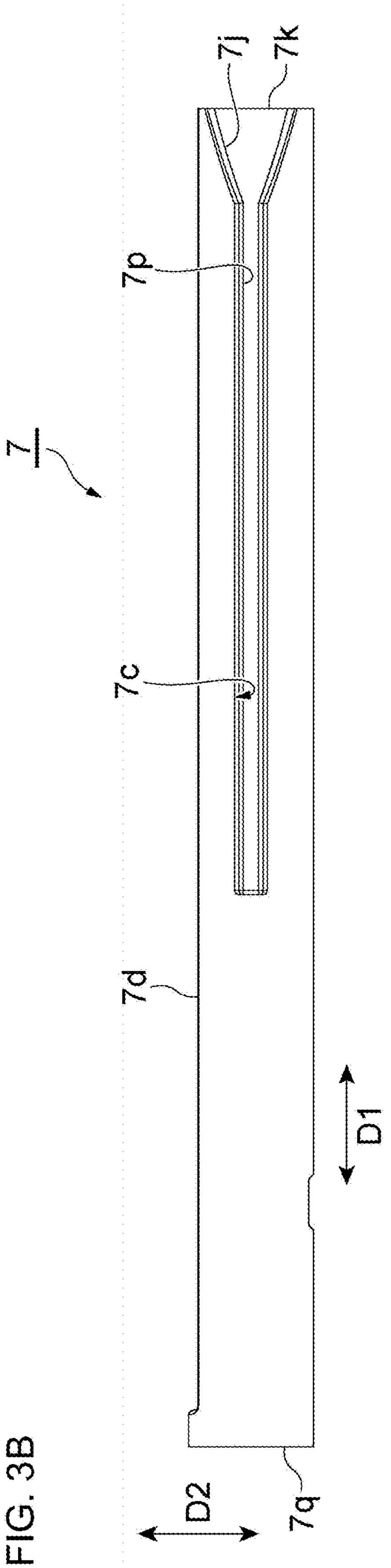
FIG. 3B is a side view of the inner tubular member in FIG. 3A as viewed from a direction different from that of FIG. 3A.
Figure 4:
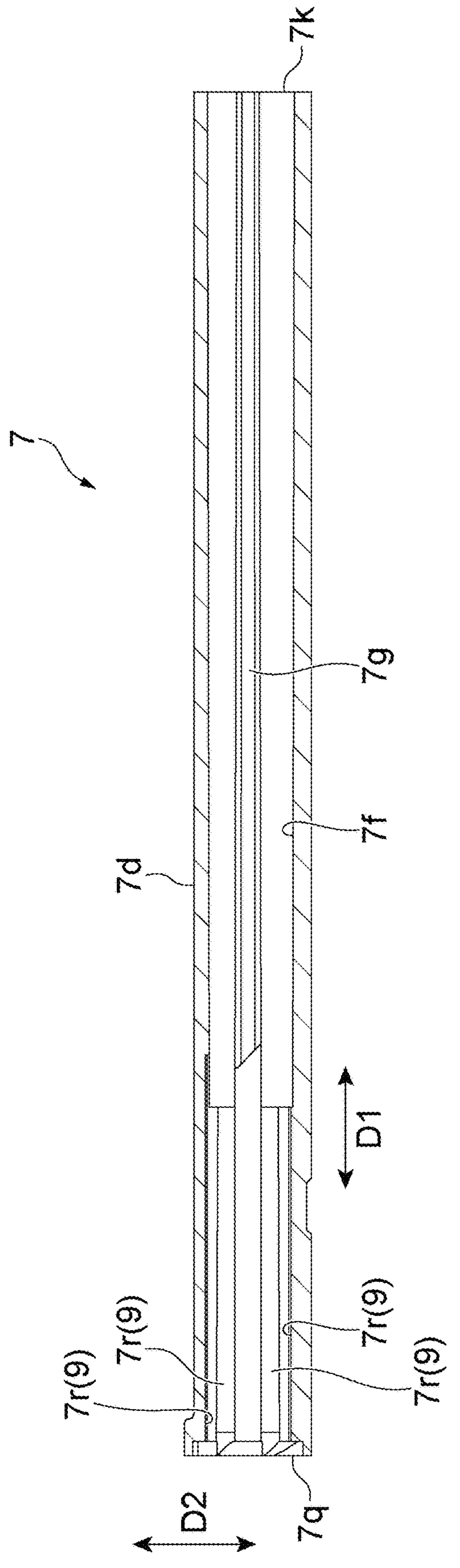
FIG. 4 is a cross-sectional view taken along line C-C of FIG. 3A.

Next, detailed structures of components of the application container 1 will be described. FIG. 3A is a side view illustrating the inner tubular member 7. FIG. 3B is a side view illustrating the inner tubular member 7 as viewed from a direction different from that of FIG. 3A. FIG. 4 is a cross-sectional view taken along line C-C of FIG. 3A. As illustrated in FIG. 2, FIG. 3A, FIG. 3B, and FIG. 4, the inner tubular member 7 has, for example, a cylindrical shape extending along the axial direction D1.

The inner tubular member 7 has the recessed portions 7*c* extending along the axial direction D1 in the outer surface 7*d*, and a flat surface 7*h* formed in the outer surface 7*d*. The flat surface 7*h* is located on a side opposite to the part of the inner tubular member 7 exposed from the through hole 4*d*, as viewed from the center of the cross section of the inner tubular member 7 which cross section is orthogonal to the axial direction D1. The flat surface 7*h*, for example, faces one of the protrusions 4*p* of the outer tubular member 4. The flat surface 7*h* has a rectangular shape, for example, as viewed from the outside of the inner tubular member 7. The flat surface 7*h* extends from one end 7*k* in the axial direction D1 of the inner tubular member 7 to the vicinity of another end 7*q* in the axial direction D1 of the inner tubular member 7.

The recessed portions 7*c* extend from the one end 7*k* in the axial direction D1 of the inner tubular member 7 to the vicinity of a center in the axial direction D1 of the inner tubular member 7. The recessed portions 7*c* each include a widened portion 7*j* extending from the one end 7*k* in the axial direction D1 and a linear portion 7*p* extending from an end portion of the widened portion 7*j* on a side opposite to the one end 7*k* along the axial direction D1. The width (length in the circumferential direction D2) of the linear portion 7*p* is uniform. The width of the widened portion 7*j* increases from the linear portion 7*p* to the one end 7*k*.

The inner tubular member 7 has the projections 7*g* extending on the inner surface 7*f* from the one end 7*k* along the axial direction D1 and a protruding portion 7*r* extending from the other end 7*q* toward the one end 7*k*. The projections 7*g* extend linearly. The inner tubular member 7 has a plurality of protruding portions 7*r*. The plurality of protruding portions 7*r* are arranged along the circumferential direction D2. The plurality of protruding portions 7*r* constitute the ratchet mechanism 9. Functions of the ratchet mechanism 9 will be described later in detail.

Figure 5A:
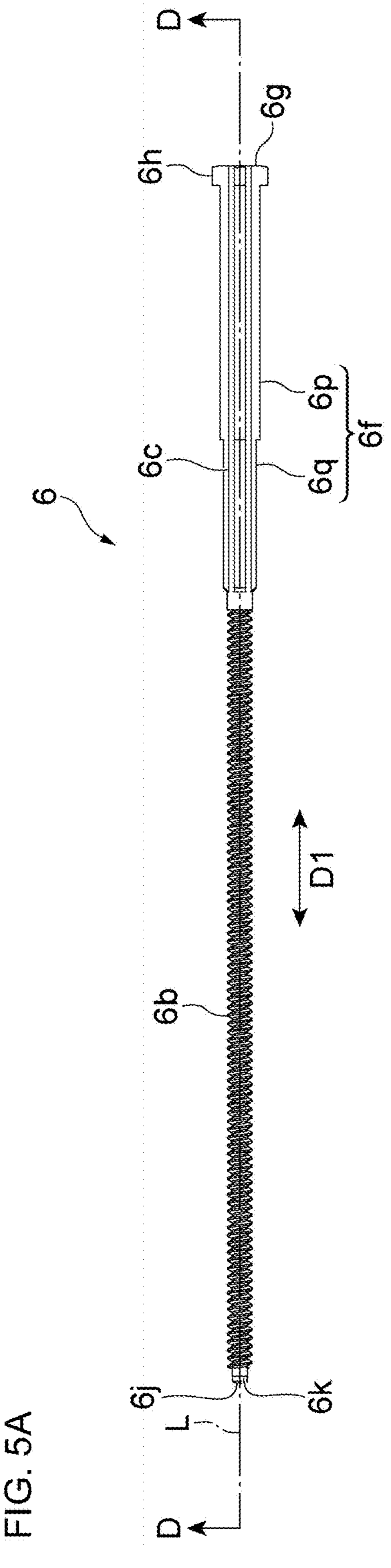
FIG. 5A is a side view illustrating a push rod of the application container according to the embodiment.
Figure 5B:
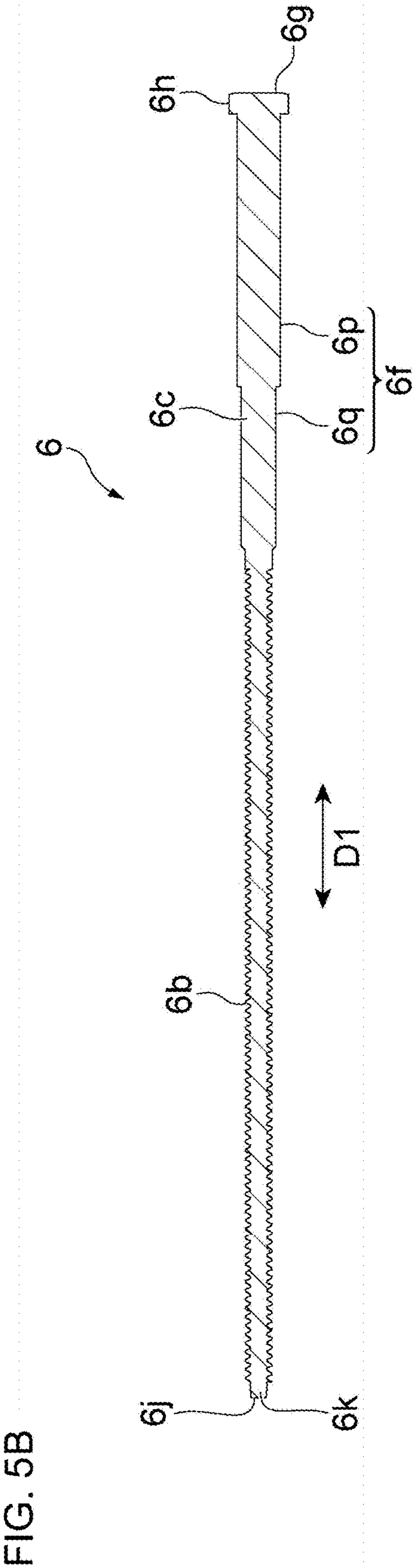
FIG. 5B is a cross-sectional view taken along line D-D of FIG. 5A.

FIG. 5A is a side view illustrating the push rod 6. FIG. 5B is a cross-sectional view taken along line D-D of FIG. 5A. As illustrated in FIG. 5A and FIG. 5B, the push rod 6 includes the male screw 6*b*, the engaging portion 6*c*, an enlarged diameter portion 6*h* located at the rear end 6*g*, and a pressing portion 6*k* located at a front end 6*j*. The pressing portion 6*k* is a part that enters the second recessed portion 5*c* (see FIG. 1B) of the piston 5 and presses the piston 5 forward.

As described earlier, the engaging portion 6*c* has the projections 6*f*. The projections 6*f* each include a first part 6*p* extending from the enlarged diameter portion 6*h* along the axial direction D1 and a second part 6*q* extending from an end portion of the first part 6*p* opposite to the enlarged diameter portion 6*h* toward the male screw 6*b*. The projection height of the first part 6*p* projecting outward in the radial direction of the push rod 6 is, for example, higher than the projection height of the second part 6*q* projecting outward in the radial direction of the push rod 6.

Figures 6A, 6B:
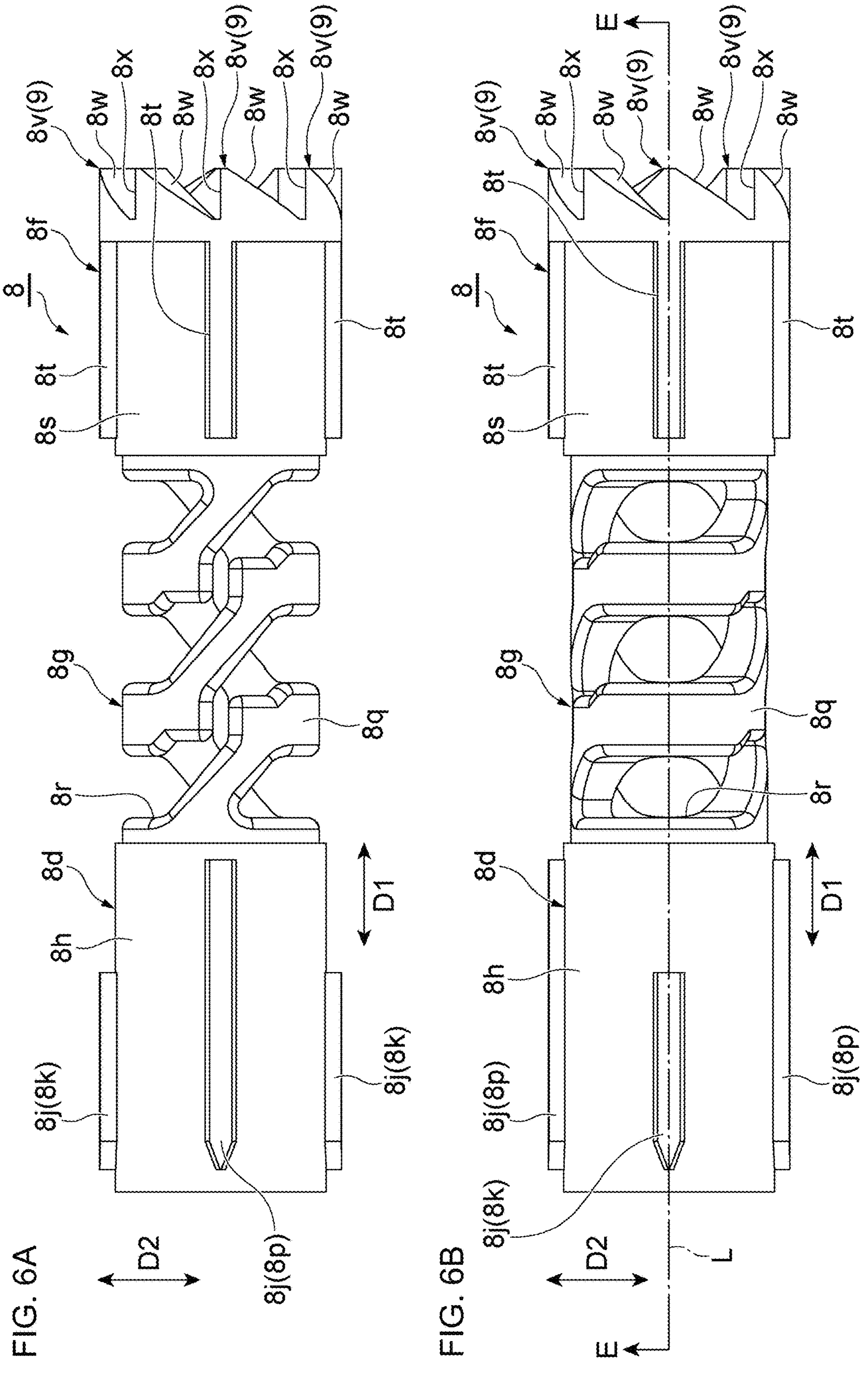
FIG. 6A is a side view illustrating a female screw member of the application container according to the embodiment.
FIG. 6B is a side view illustrating the female screw member as viewed from a direction different from that of FIG. 6A.
Figure 7:
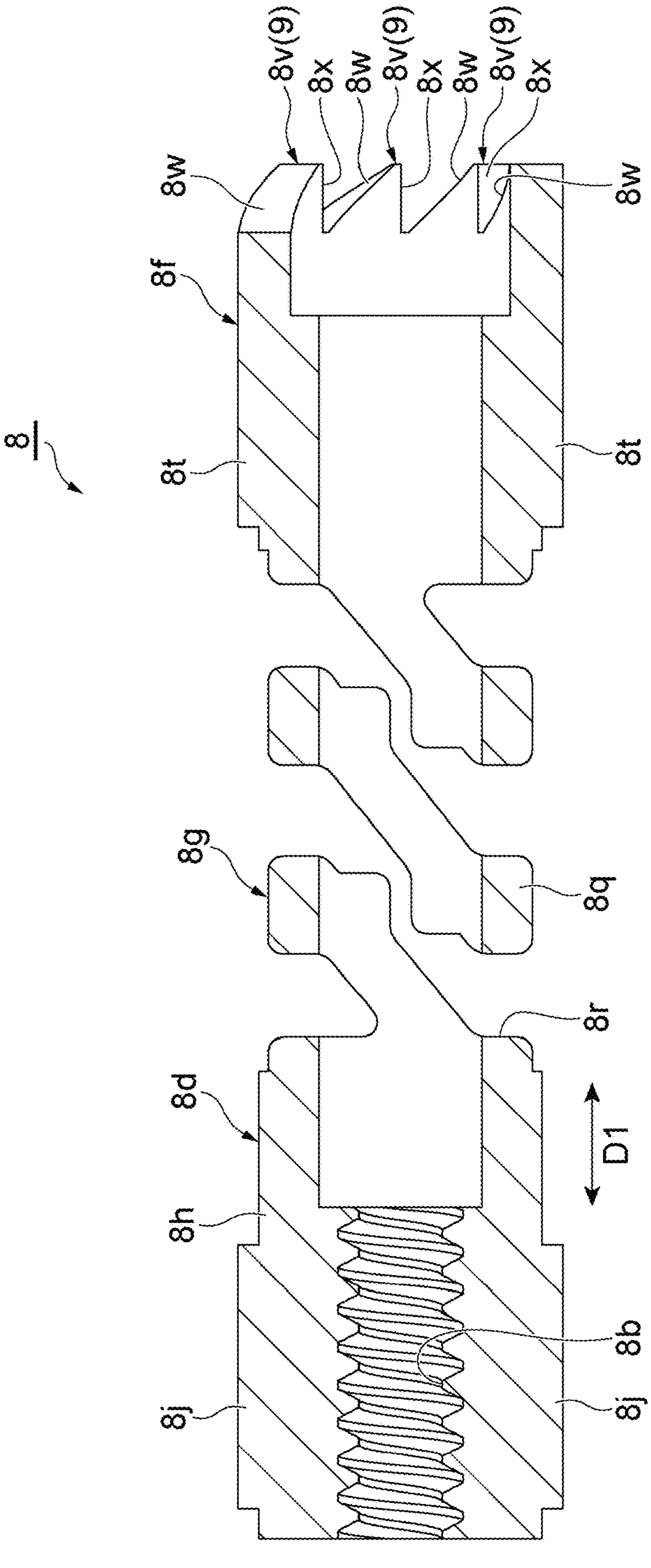
FIG. 7 is a cross-sectional view taken along line E-E of FIG. 6B.

FIG. 6A is a side view illustrating the female screw member 8. FIG. 6B is a side view illustrating the female screw member 8 as viewed from a direction different from that of FIG. 6A. FIG. 7 is a cross-sectional view taken along line E-E of FIG. 6B. As illustrated in FIG. 6A, FIG. 6B, and FIG. 7, the female screw member 8 includes a front side tubular portion 8*d*, a rear side tubular portion 8*f*, and a spring portion 8*g* located between the front side tubular portion 8*d* and the rear side tubular portion 8*f*.

The front side tubular portion 8*d* has a cylindrical shape, for example. The above-described female screw 8*b* of the female screw member 8 is, for example, formed inside the front side tubular portion 8*d*. The front side tubular portion 8*d* has a protruding portion 8*j* that protrudes outward in the radial direction of the female screw member 8 from an outer surface 8*h* of the front side tubular portion 8*d* and that extends along the axial direction D1. The protruding portion 8*j* engages with an inner surface 2*q* (see FIG. 1B) of the leading tube 2 in the circumferential direction D2. With this configuration, the female screw member 8 engages with the leading tube 2 so as to be rotatable synchronously with the leading tube 2 and movable in the axial direction D1 with respect to the leading tube 2.

The front side tubular portion 8*d* has a plurality of protruding portions 8*j* arranged along the circumferential direction D2. The plurality of protruding portions 8*j* include, for example, first protruding portions 8*k* and second protruding portions 8*p* having a longer length in the axial direction D1 than the first protruding portions 8*k*. The first protruding portions 8*k* and the second protruding portions 8*p* are disposed so as to be alternately arranged along the circumferential direction D2.

The spring portion 8*g* has a tubular portion 8*q* extending from the front side tubular portion 8*d* to the rear side tubular portion 8*f*, and a slit 8*r* that penetrates the tubular portion 8*q* in the radial direction of the female screw member 8 and that is formed in a helical manner. The outside diameter of the tubular portion 8*q* is, for example, smaller than the outside diameter of the front side tubular portion 8*d* and smaller than the outside diameter of the rear side tubular portion 8*f*. Because the spring portion 8*g* has the slit 8*r* formed in a helical manner in the tubular portion 8*q*, the spring portion 8*g* can be expanded and contracted in the axial direction D1.

The rear side tubular portion 8*f* has a cylindrical shape, for example. The rear side tubular portion 8*f* has a protruding portion 8*t* that protrudes outward in the radial direction of the female screw member 8 from an outer surface 8*s* of the rear side tubular portion 8*f* and that extends along the axial direction D1. As with the protruding portions 8*j* described above, the protruding portion 8*t* engages with the inner surface 2*q* of the leading tube 2 in the circumferential direction D2. The rear side tubular portion 8*f* has, for example, a plurality of protruding portions 8*t* arranged along the circumferential direction D2.

The female screw member 8 has a projecting portion 8*v* formed at one end thereof in the axial direction D1. The female screw member 8 has, for example, a plurality of projecting portions 8*v*. Each projecting portion 8*v* projects from the rear side tubular portion 8*f* in the axial direction D1. The projecting portion 8*v* is formed by an inclined surface 8*w* inclined with respect to both the axial direction D1 and the circumferential direction D2 and an abutment surface 8*x* extending in the axial direction D1 and the radial direction of the female screw member 8.

The plurality of projecting portions 8*v* are arranged along the circumferential direction D2. The abutment surface 8*x* extends in the forward direction from a rear end of the inclined surface 8*w*. The plurality of projecting portions 8*v* engage with the plurality of protruding portions 7*r* (see FIG. 4) of the inner tubular member 7 described earlier. The plurality of projecting portions 8*v* constitute the ratchet mechanism 9 together with the plurality of protruding portions 7*r*.

When the inner tubular member 7 is rotated relative to the female screw member 8 in a direction (one direction) in which the protruding portions 7*r* come into contact with the inclined surfaces 8*w* of the projecting portions 8*v*, the protruding portions 7*r* go over the inclined surfaces 8*w* in the circumferential direction D2, and the inner tubular member 7 and the push rod 6 are rotated relative to the female screw member 8. At this time, the screwing action described earlier functions, so that the push rod 6 advances with respect to the female screw member 8 and the drawing material M is pushed by the push rod 6 to be fed from the opening 2*b* of the leading tube 2.

On the other hand, when the inner tubular member 7 attempts to be rotated relative to the female screw member 8 in a direction (opposite direction) in which the protruding portions 7*r* come into contact with the abutment surfaces 8*x* of the projecting portions 8*v*, the protruding portions 7*r* do not go over the abutment surfaces 8*x*, and therefore, the inner tubular member 7 is not rotated relative to the female screw member 8. Hence, in the present embodiment, the push rod 6 does not retract with respect to the female screw member 8, and therefore, the drawing material M does not retract either. As described above, the ratchet mechanism 9 allows a relative rotation in the one direction of the inner tubular member 7 with respect to the female screw member 8, and restricts a relative rotation in the opposite direction of the inner tubular member 7 with respect to the female screw member 8.

Next, operation of parts of the application container 1 at the time of usage will be described. First, in the state illustrated in FIG. 1B, the cap 3 is removed from the leading tube 2 to expose the tapered surface 2*c* and the opening 2*b* of the leading tube 2. When the outer tubular member 4 is rotated in the one direction relative to the leading tube 2 in this state, the outer tubular member 4, the inner tubular member 7, and the push rod 6 are rotated in the one direction relative to the leading tube 2 and the female screw member 8. At this time, the screwing action between the female screw 8*b* and the male screw 6*b* functions and the push rod 6 advances with respect to the female screw member 8. The drawing material M is thus fed from the opening 2*b* of the leading tube 2, and the drawing material M is provided for usage.

As described earlier, when the drawing material M is used for the first time (in the initial state), the position in the axial direction D1 of the rear end 6*g* of the push rod 6 coincides with the position in the axial direction D1 of the rear end 4*k* of the through hole 4*d*. When the drawing material M is fed from the opening 2*b* of the leading tube 2 in this state, the visible portion 6*d* of the push rod 6 advances with respect to the transparent portion 7*b* of the inner tubular member 7, and the length of the part of the visible portion 6*d* which part is visible from the transparent portion 7*b* is shortened.

Figure 8A:
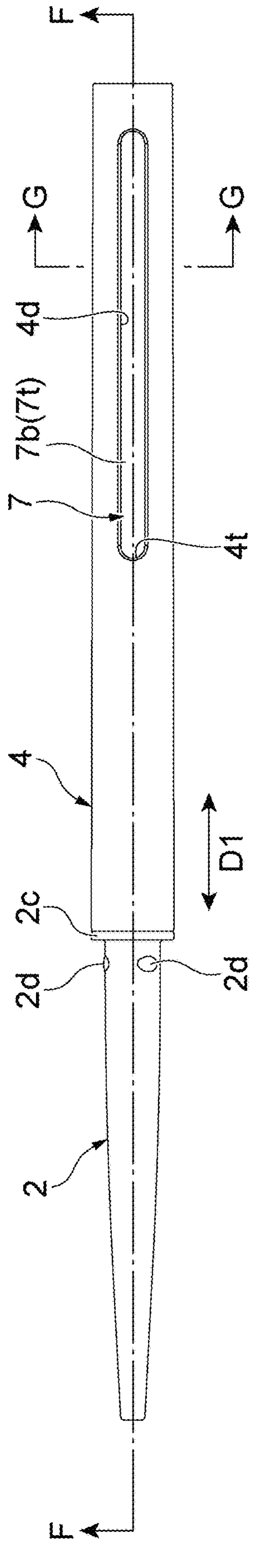
FIG. 8A is a side view illustrating the application container in a state in which a cap of the application container in FIG. 1A is removed and in which a drawing material is used up.
Figure 8B:
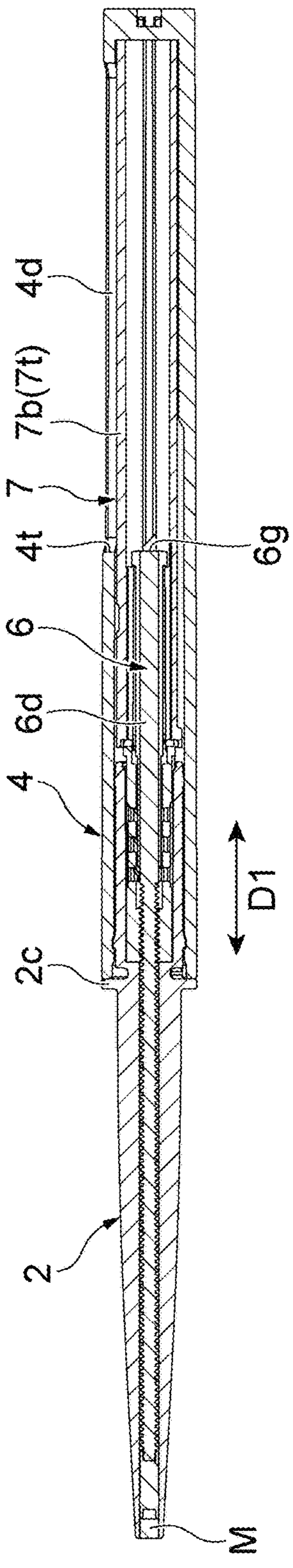
FIG. 8B is a cross-sectional view taken along line F-F of FIG. 8A.

When the drawing material M is further used, the visible portion 6*d* further advances with respect to the transparent portion 7*b* as illustrated in FIG. 8A and FIG. 8B. The position in the axial direction D1 of the rear end 6*g* of the push rod 6 coincides with the position in the axial direction D1 of the front end 4*t* of the through hole 4*d* when the drawing material M is about to be exhausted. At this time, as illustrated in FIG. 8B and FIG. 9A, the push rod 6 (visible portion 6*d*) ceases to be present on the inner side of the through hole 4*d* (inward with respect to the through hole 4*d* in the radial direction of the application container 1) due to the advancement of the push rod 6. The visible portion 6*d* is therefore no longer visible from the transparent portion 7*b*.

Figure 9A:
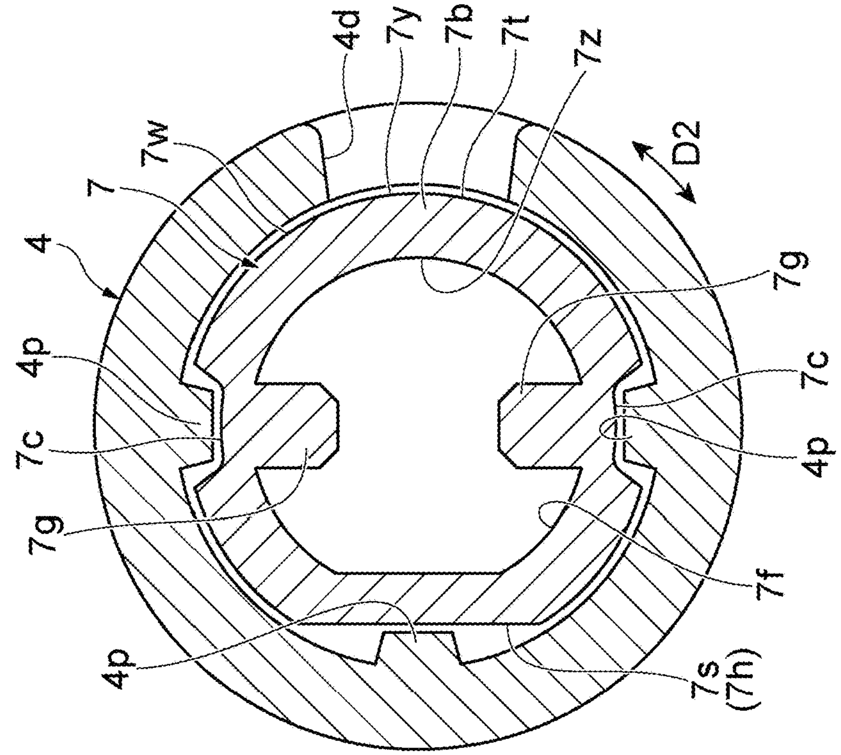
FIG. 9A is a cross-sectional view taken along line G-G of FIG. 8A.
Figure 10A:
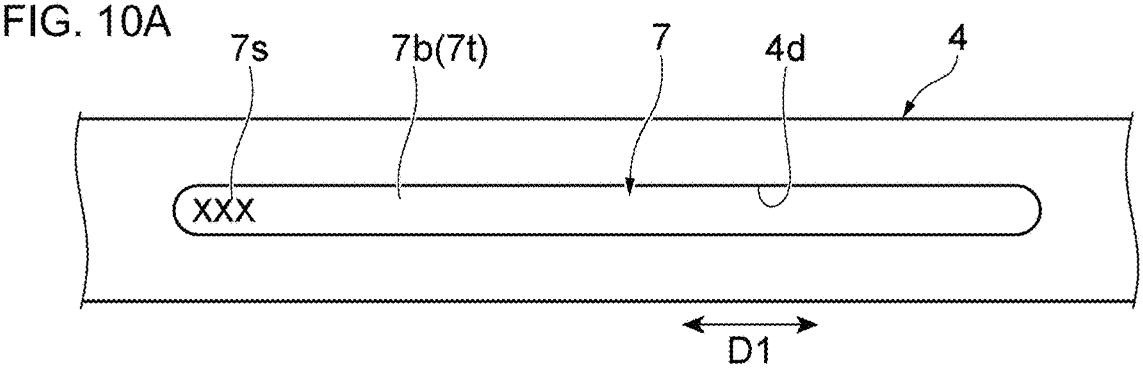
FIGS. 10A, 10B, 10C, and 10D are views illustrating examples of a through hole, a transparent portion, or a visible portion of the application container according to the embodiment.

The inner tubular member 7, for example, has a printed portion 7*s* located on a side opposite to the through hole 4*d*, as viewed from the transparent portion 7*b*. As illustrated in FIG. 8B, FIG. 9A, and FIG. 10A, the printed portion 7*s* is, for example, provided at an end portion on a front side in an exposed portion 7*t*. The exposed portion 7*t* is a part of the inner tubular member 7 exposed from the through hole 4*d*.

The printed portion 7*s* is provided on the flat surface 7*h*. The printed portion 7*s* is formed by ink, for example. The printed portion 7*s* is character information. The printed portion 7*s* is, for example, a display to the effect that the drawing material M will soon be exhausted (characters "end" as an example). The printed portion 7*s* is hidden by the push rod 6 and is thus not visible when the push rod 6 is present on the inner side of the exposed portion 7*t*.

However, when the push rod 6 advances as the drawing material M is used and then the rear end 6*g* of the push rod 6 reaches a front end portion of the exposed portion 7*t*, the printed portion 7*s* that has been hidden by the push rod 6 starts to appear from its rear side. Further, when the rear end 6*g* advances beyond the front end portion of the exposed portion 7*t*, all of the printed portion 7*s* is visible. Accordingly, the user can recognize that the drawing material M is about to be exhausted.

Figure 9B:
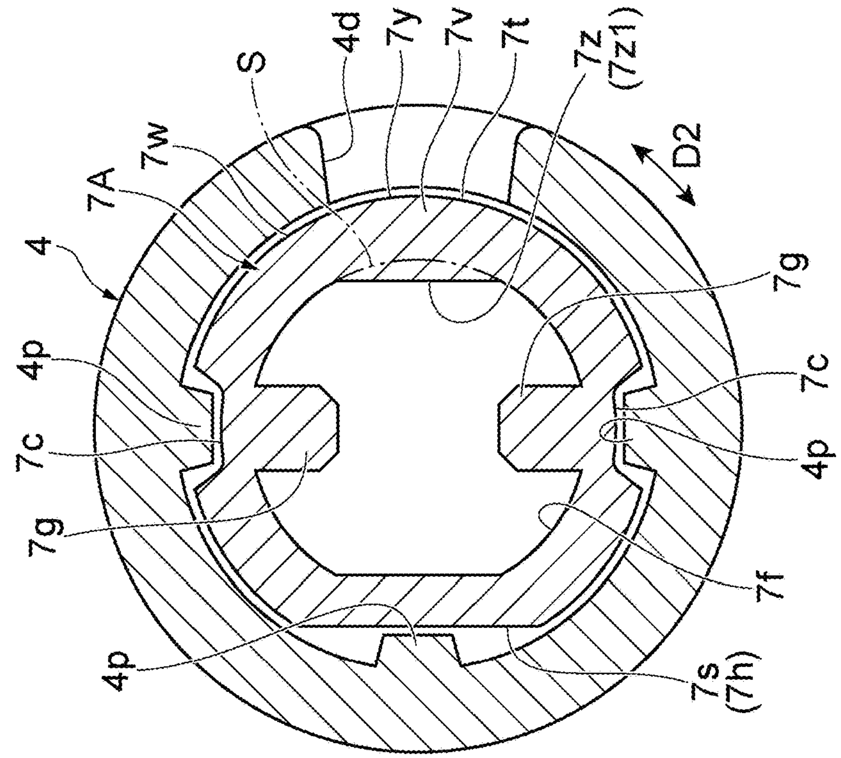
FIG. 9B is a cross-sectional view illustrating an application container according to a modification.

FIG. 9B is a cross-sectional view illustrating an inner tubular member 7A according to a modification. The inner tubular member 7A includes a transparent portion 7*v* having a shape different from that of the transparent portion 7*b*. A configuration of the inner tubular member 7A other than the transparent portion 7*v* is identical to that of the inner tubular member 7. Each of the inner tubular member 7 and the inner tubular member 7A has an outer surface 7*w* facing the outer tubular member 4 and an inner surface 7*f* facing the push rod 6.

Each of the transparent portion 7*b* and the transparent portion 7*v* has a first surface 7*y* exposed from the through hole 4*d* and a second surface 7*z* facing in a direction opposite to the first surface 7*y*. In a cross section orthogonal to the axial direction D1, the first surface 7*y* of the transparent portion 7*b* and the second surface 7*z* of the transparent portion 7*b* are formed in a circular arc shape and extend in parallel with each other.

In a cross section orthogonal to the axial direction D1, the first surface 7*y* of the transparent portion 7*v* is formed in a circular arc shape. In the cross section orthogonal to the axial direction D1, the second surface 7*z* of the transparent portion 7*v* includes a protruding surface portion 7*z*1 that protrudes inward of the inner tubular member 7A with respect to an imaginary extension surface S extending along the inner surface 7*f*.

The protruding surface portion 7*z*1, for example, has a flat shape extending in a direction orthogonal to the radial direction of the inner tubular member 7A. However, the protruding surface portion 7*z*1 may protrude inward in the radial direction of the inner tubular member 7A. Because the transparent portion 7*v* has the protruding surface portion 7*z*1, the printed portion 7*s* appears to be larger due to effects of a lens when the printed portion 7*s* is viewed from the through hole 4*d* than in a case where the protruding surface portion 7*z*1 is not provided.

Next, operational effects obtained from the application container 1 according to the present embodiment will be described in more detail. As illustrated in FIG. 1B and FIG. 8B, according to the application container 1, it is possible to recognize the remaining amount of the drawing material M when the visible portion 6*d* of the push rod 6 that is visible through the transparent portion 7*b* is viewed.

In the application container 1, the inner tubular member 7 including the transparent portion 7*b* is fixed to the outer tubular member 4, and the inner tubular member 7 does not move with respect to the outer tubular member 4. Hence, because the inner tubular member 7, which is located between the through hole 4*d* of the outer tubular member 4 and the push rod 6, does not move, a possibility of foreign matter entering the inner side of the through hole 4*d* can be reduced. A hygienic application container 1 can therefore be provided. Further, because the inner tubular member 7 is fixed on the inner side of the through hole 4*d* to the outer tubular member 4, airtightness on the inner side of the through hole 4*d* can be ensured.

In the present embodiment, the application container 1 includes the tubular female screw member 8 that is rotatable synchronously with the leading tube 2 within the leading tube 2 and that internally has the female screw 8*b*. The push rod 6 has the male screw 6*b* that screws into the female screw 8*b*. The outer tubular member 4 is rotatable relative to the leading tube 2. In response to a relative rotation of the outer tubular member 4 with respect to the leading tube 2, the screwing action between the male screw 6*b* and the female screw 8*b* functions, so that the push rod 6 advances with respect to the female screw member 8. In this case, when the outer tubular member 4 is relatively rotated with respect to the leading tube 2, the push rod 6 advances and the drawing material M can come out from the opening 2*b* by the push rod 6.

In the present embodiment, as illustrated in FIG. 8B, FIG. 9A, FIG. 9B, and FIG. 10A, the inner tubular member 7 has the printed portion 7*s* located on a side opposite to the through hole 4*d* as viewed from the transparent portion 7*b*. The remaining amount of the drawing material M is recognizable when the printed portion 7*s* is visually checked. In this case, the user using the application container 1 can more directly recognize the remaining amount of the drawing material M by visually checking the printed portion 7*s*. In the case of the example illustrated in FIG. 10A, the user can recognize by viewing the printed portion 7*s* that the drawing material M is about to be exhausted. Hence, the remaining amount of the drawing material M is more noticeable.

As described earlier, the inner tubular member 7A has the outer surface 7*w* facing the outer tubular member 4 and the inner surface 7*f* facing the push rod 6, and the transparent portion 7*v* has the first surface 7*y* exposed from the through hole 4*d* and the second surface 7*z* facing in a direction opposite to the first surface 7*y*. The second surface 7*z* may have the protruding surface portion 7*z*1 that protrudes inward of the inner tubular member 7A with respect to the imaginary extension surface S extending along the inner surface 7*f*. In this case, because the second surface 7*z* of the transparent portion 7*v* protrudes inward, the transparent portion 7*v* has a lens shape. Hence, the printed portion 7*s* appears to be enlarged when the printed portion 7*s* is visually checked through the transparent portion 7*v*. The remaining amount of the drawing material M can therefore be displayed in a more noticeable manner.

In the present embodiment, the application container 1 includes the ratchet mechanism 9 that allows a relative rotation in the one direction of the outer tubular member 4 with respect to the leading tube 2 and that restricts a relative rotation in the direction opposite to the one direction of the outer tubular member 4 with respect to the leading tube 2. The push rod 6 that is capable of only advancing in response to the relative rotation in the one direction of the outer tubular member 4 with respect to the leading tube 2 is visible through the transparent portion 7*b*. In this case, since the push rod 6 does not retract, the display of the remaining amount of the drawing material M using the visible portion 6*d* of the push rod 6 can be more accurate. Hence, the remaining amount of the drawing material M can be recognized more appropriately.

The application containers according to the embodiment and the modification of the present disclosure have been described above. However, the application container according to the present disclosure is not limited to the embodiment or the modification described above, and may be further modified within the scope of the spirit described in claims. That is, the shapes, sizes, materials, number, and arrangement of parts of the application container according to the present disclosure can be modified as appropriate within the scope of the spirit described above.

Figure 10B:
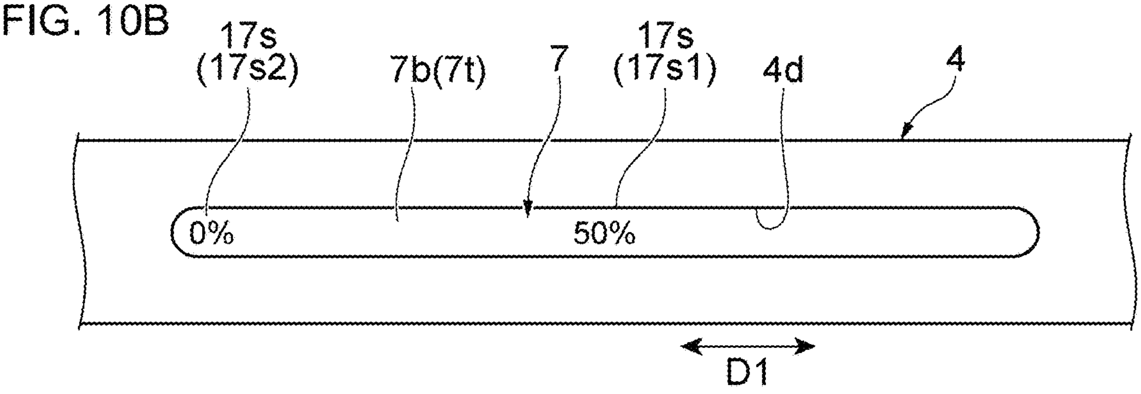

For example, the foregoing embodiment has described the printed portion 7*s* as character information formed at the end portion on the front side in the exposed portion 7*t* of the inner tubular member 7, as illustrated in FIG. 10A. However, the configuration of the printed portion is not limited to the example of FIG. 10A. As illustrated in FIG. 10B, the inner tubular member 7 may have a printed portion 17*s* that indicates a remaining amount rate of the drawing material M, in place of the printed portion 7*s*.

The printed portion 17*s* includes, for example, a first printed portion 17*s*1 located at a center in the axial direction D1 of the exposed portion 7*t* and a second printed portion 17*s*2 located at the end portion on the front side of the exposed portion 7*t*. The first printed portion 17*s*1 is character information indicating that the remaining amount of the drawing material M is approximately half (approximately 50%). The second printed portion 17*s*2 is character information indicating that the drawing material M is about to be exhausted (close to approximately 0%).

According to the application container including the inner tubular member having the printed portion 17*s*, the user can recognize the remaining amount of the drawing material M with higher accuracy by viewing the first printed portion 17*s*1 and the second printed portion 17*s*2 that gradually appear from the rearward direction as the drawing material M is used. Hence, the user can predict a timing of replacing the application container 1 with higher accuracy.

Incidentally, in the example of FIG. 10B, the first printed portion 17*s*1 displaying "50%" and the second printed portion 17*s*2 displaying "0%" have been described. However, printed portions displaying 0%, 10%, 20%, 30%, 40%, 50%, 60%, 70%, 80%, 90%, and 100% may be provided in place of the first printed portion 17*s*1 and the second printed portion 17*s*2.

Further, the printed portions do not have to be character information such as "0%," and may be, for example, a scale indicating the remaining amount rate of the drawing material M. Such scale may be formed on the transparent portion 7*b*, or may be formed at a position above or below the transparent portion 7*b* on the outer tubular member 4 as viewed from the side. Thus, the configuration of the printed portion indicating the remaining amount of the drawing material M can be modified as appropriate.

Figure 10C:
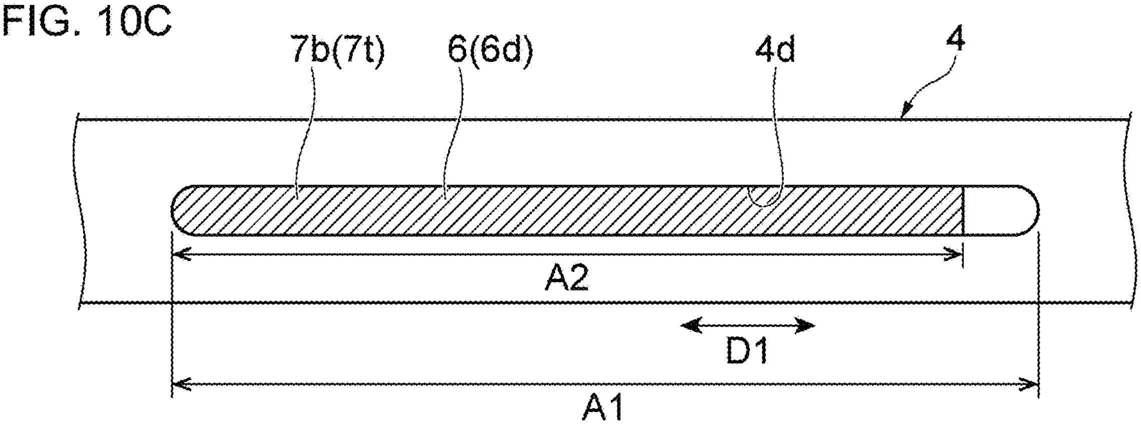
Figure 10D:
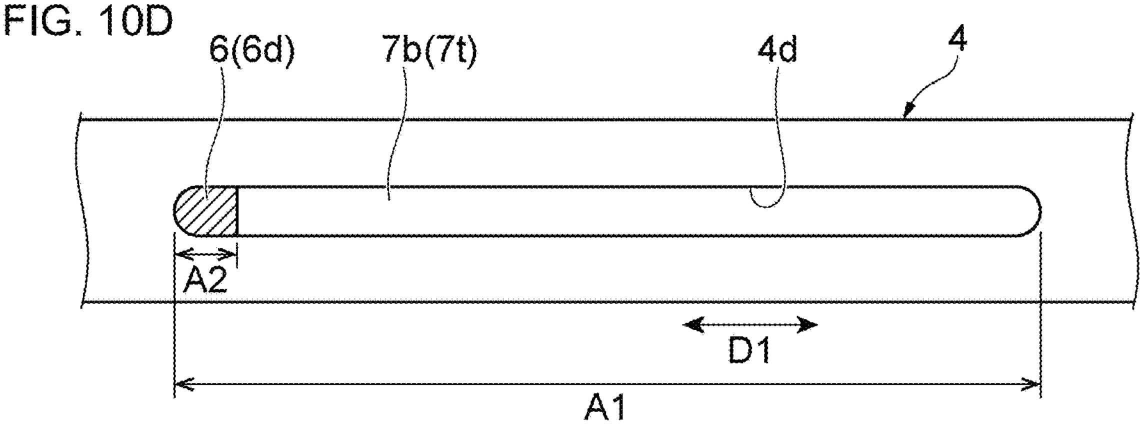

Further, as illustrated in FIG. 10C and FIG. 10D, an application container including an inner tubular member not having the printed portion may be provided. In this case, a ratio of a length A2 of the visible portion 6*d* of the push rod 6 to a length A1 of the transparent portion 7*b* represents the remaining amount of the drawing material M. FIG. 10C indicates that the remaining amount of the drawing material M is approximately 90%. FIG. 10D indicates that the remaining amount of the drawing material M is approximately 5%. It is thus possible to omit the printed portion.

In the foregoing embodiment, description has been made of the application container 1 that includes the ratchet mechanism 9 allowing only a relative rotation in the one direction of the outer tubular member 4 with respect to the leading tube 2 and in which the push rod 6 that is capable of only advancing is visible. Alternatively, an application container not including the ratchet mechanism 9 may be provided. An application container may be provided which allows relative rotations in the one direction and the opposite direction of the outer tubular member with respect to the leading tube, and in which a push rod that is capable of advancing and retracting is visible. Also in this case, operational effects similar to those of the foregoing embodiment are obtained when the position of the push rod in a state in which a front end of the drawing material is exposed at the opening of the leading tube is viewed from the transparent portion.

In the foregoing embodiment, description has been made of the application container 1 including the inner tubular member 7 and the female screw member 8 having the female screw 8*b* and the spring portion 8*g*. Alternatively, the application container may include an inner tubular member having a female screw and a spring portion, in place of the inner tubular member 7 and the female screw member 8. In this case, the number of parts of the application container can be reduced.

In the foregoing embodiment, description has been made of the application container 1 that feeds the drawing material M by a relative rotation in the one direction of the outer tubular member 4 with respect to the leading tube 2. Alternatively, the application container may be an application container that does not use the relative rotation. That is, the application container may be one that has a mechanical extruding mechanism of a knock type or the like and that extrudes the drawing material by the extruding mechanism, or may be one that includes an extruding mechanism of a squeeze type.

In the foregoing embodiment, description has been made of the application container 1 provided with the drawing material M as a cosmetic material. Alternatively, the drawing material may be one other than a cosmetic material. For example, the drawing material may be a core material used in a writing instrument such as a crayon. Thus, the application container according to the present disclosure can be applied to not only cosmetic materials but also various drawing materials in writing instruments, stationery, and the like.

What is claimed is:

1. An application container comprising:

a leading tube that is configured to house a drawing material and that has an opening at a tip end of the leading tube, the opening allowing the drawing material to come out;

an outer tubular member coupled to a side of the leading tube opposite to the opening;

an inner tubular member fixed within the outer tubular member to the outer tubular member; and a push rod that is rotatable synchronously with the inner tubular member within the inner tubular member and that is configured to advance with respect to the inner tubular member and push the drawing material, so that the drawing material comes out from the opening, wherein the outer tubular member has a through hole formed in a side surface of the outer tubular member, at least a part of the inner tubular member that is exposed from the through hole is a transparent portion through which an inside of the inner tubular member is visible, and the push rod includes a visible portion that is visible from an outside of the inner tubular member through the transparent portion, so that a remaining amount of the drawing material is recognizable when a state of the visible portion that is visible through the transparent portion is visually checked.

2. The application container according to claim 1, further comprising:

a tubular female screw member that is rotatable synchronously with the leading tube within the leading tube and that internally has a female screw, wherein the push rod has a male screw configured to screw into the female screw, the outer tubular member is rotatable relative to the leading tube, and in response to a relative rotation of the outer tubular member with respect to the leading tube, a screwing action between the male screw and the female screw functions, so that the push rod advances with respect to the female screw member.

3. The application container according to claim 1, wherein the inner tubular member has a printed portion that is located on a side opposite to the through hole as viewed from the transparent portion, and the remaining amount of the drawing material is recognizable when the printed portion is visually checked.

4. The application container according to claim 3, wherein the inner tubular member has an outer surface facing the outer tubular member and an inner surface facing the push rod, the transparent portion has a first surface exposed from the through hole and a second surface facing in a direction opposite to the first surface, and the second surface includes a protruding surface portion that protrudes inward of the inner tubular member with respect to an imaginary extension surface extending along the inner surface.

5. The application container according to claim 2, further comprising:

a ratchet mechanism that allows a relative rotation in one direction of the outer tubular member with respect to the leading tube and that restricts a relative rotation in a direction opposite to the one direction of the outer tubular member with respect to the leading tube, wherein the push rod that is capable of only advancing in response to the relative rotation in the one direction of the outer tubular member with respect to the leading tube is visible through the transparent portion.

* * * * *